April 21, 1936.    E. J. SIMANEK    2,037,936
BRAKE KEY
Filed April 9, 1934    2 Sheets-Sheet 1
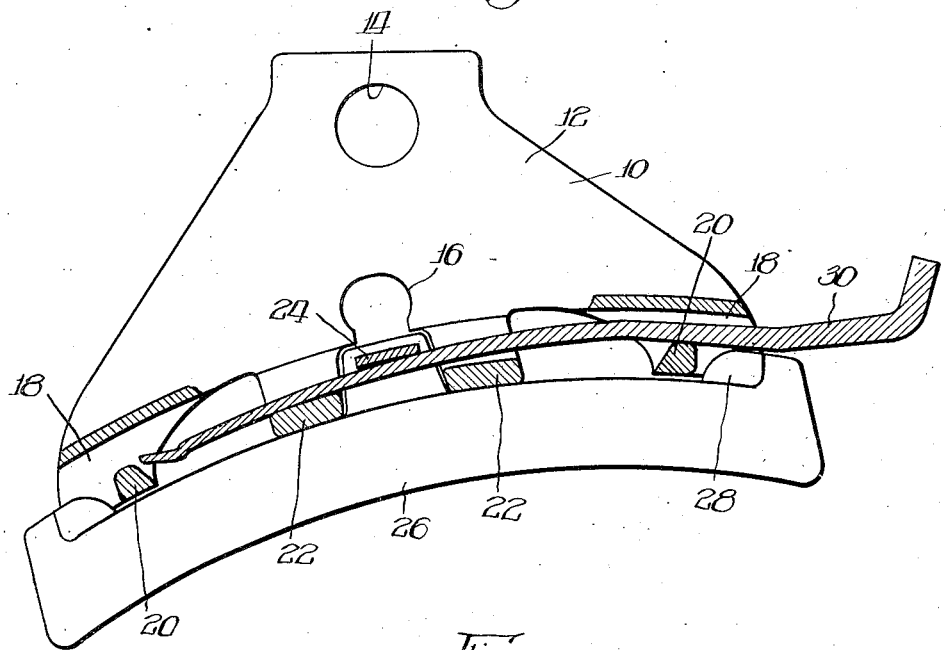
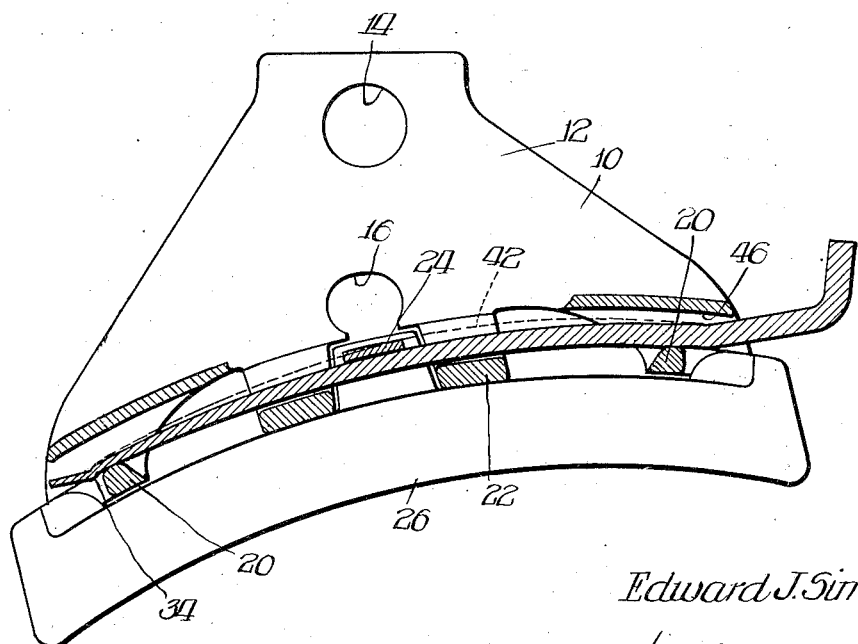
Inventor
Edward J. Simanek,
By Attorneys April 21, 1936.  E. J. SIMANEK  2,037,936
BRAKE KEY
Filed April 9, 1934   2 Sheets-Sheet 2

Inventor
Edward J. Simanek,
By Wilkinson, Huxley, Byron & Knight
Attorneys

Patented Apr. 21, 1936

2,037,936

UNITED STATES PATENT OFFICE 2,037,936

BRAKE KEY

Edward J. Simanek, Chicago, Ill., assignor to American Steel Foundries, Chicago, Ill., a corporation of New Jersey Application April 9, 1934, Serial No. 719,705

18 Claims. (Cl. 188—243)

This invention pertains to a brake head and shoe arrangement, and more particularly to a brake shoe key forming securing means therebetween.

In the present A. R. A. construction the brake head and shoe assembly consists essentially of a brake head having spaced toes and provided with spaced head or center lugs adapted to be disposed on either side of the brake shoe center lug, the toes and center lugs of the brake head contacting the brake shoe. The connection is made by a key which is normally not resilient, but is a set wedge and is disposed in contacting relation with the center lugs of both the shoe and head. In such constructions wear readily causes the shoe to become loose from the head.

In the replacement of brake shoe keys for any reason, either due to wear or breakage of the key, or replacing the head or shoe, truck clearance conditions which at present exist make it very difficult to properly and easily drive the key into final position.

It is therefore an object of this invention to provide a brake head arrangement comprising a brake head and shoe and securing means therebetween which will maintain the shoe and head in tight assembly regardless of wear between relative parts.

Another object is to provide a brake head arrangement wherein the securing key is adapted to be flexed between securing means on the head and shoe for providing a tight assembly.

A further object is to provide a brake head and shoe assembly wherein a flexible key is adapted to be inserted and driven to assembly position for providing a truss locking means between the head and shoe.

A yet further object is to provide a brake head and shoe arrangement wherein the locking means is effective over substantially the entire depth of the brake head.

A still further object is to provide a key which is insertable into the head and shoe for such a major portion of its length that it can be readily applied to trucks where the present day clearance conditions interfere with the driving of the standard or other keys.

A different object is to provide a brake shoe key so shaped as to form a wedge in the application to brake shoes and heads provided only with center lugs, yet one in which the parts of the key are so disposed that proper clearances are maintained between the parts of the shoe and head adjacent the ends thereof.

Thus all the advantages, and certain additional advantages, are obtained in the brake head and shoe arrangement, and the key herein described, over that illustrated and described in co-pending Peycke application Serial No. 651,882, filed January 16, 1933.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a side elevation partly in section showing the key inserted to a position with respect to the shoe and head just prior to its being driven home;

Figure 2 is a side elevation partly in section corresponding to Figure 1 showing the brake shoe key in final assembled position;

Figure 3:
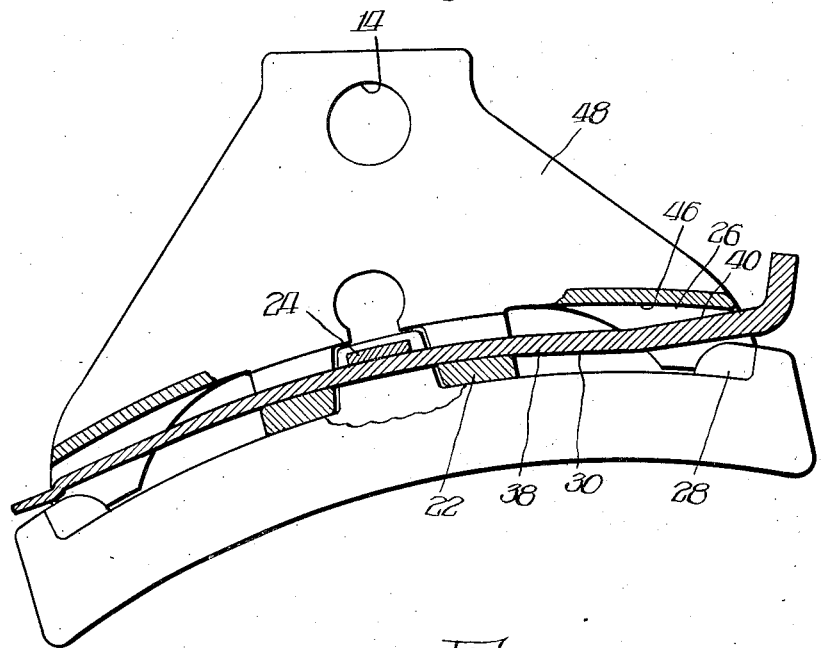
Figure 3 is a side elevation partly in section of a brake shoe and head showing the application of the key thereto where the brake head is provided with no tie bars.

Referring first of all more particularly to the brake shoe and head arrangement illustrated in Figures 1 and 2, the brake head 10 is substantially of conventional construction, being provided with the body portion 12 and securing means in the form of the apertures 14 and 16 for application of the brake head to a brake beam and to a brake hanger. The head is provided adjacent the ends thereof with the spaced toe portions 18 connected inwardly of the ends thereof by means of the toe lugs or tie bears 20. The head 10 is also provided with brake shoe engaging intermediate head lugs or spaced center lugs 22 disposed between the toe lugs 20 and adapted to embrace the center lug 24 provided on the brake head engaging portion or back of the brake shoe 26, the brake shoe being preferably provided with the lugs 28 adapted to be embraced between the toe portions 18 disposed outwardly of the tie bars 20. It will be noted that lugs 22 are spaced away from the head at a greater distance than lugs 20 thus providing clearance with the key 30, as hereinafter more fully disclosed.

Figure 4:
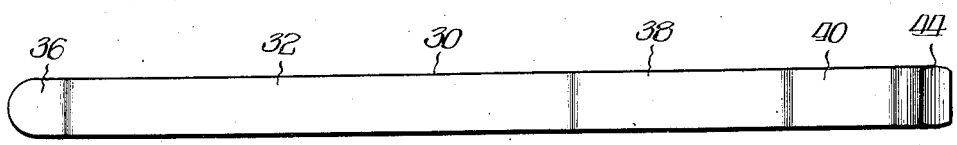
Figure 4 is a top plan view of the brake shoe key embodying the invention.
Figure 5:
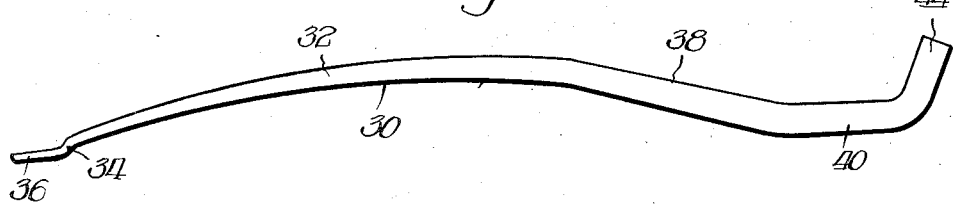
Figure 5 is a side elevation of the brake shoe key illustrated in Figure 4.

Securing means between the brake shoe and brake head is provided in the form of the key 30 shown particularly in Figures 4 and 5. The key is of substantially constant width and is preferably of spring steel. The body portion of the brake shoe key tapers for a major portion of its length as illustrated at 32, and is provided at the entrance end thereof with the offset portion 34 terminating in the tapered toe portion 36 whereby the offset at the bottom of the key serves as means to prevent the key from becoming accidentally disengaged, as particularly illustrated in Figure 2 which shows the final secured position of the key where the offset portion 34 is engaged over the tie bar 20.

The key is provided with a substantially straight portion 38 which merges into the arcuate portion 32 adjacent the crown thereof and is of increasing thickness from the termination of the arcuate portion adjacent the top of the key, the portion 38 merging into the straight offset portion 40. The portion 38, then, is of such nature that it forms a cam and engages the tie bar 20 at the top of the head as the key is driven from the position illustrated in Figure 1 to the complete assembled position shown in Figure 2, thereby providing the spring tension which holds the shoe tightly in position. The deflection of the key is shown by the difference in the dotted line 42 and the upper portion of the key illustrated in Figure 2, the dotted line showing the position the key would take if the shoe were not in place.

The portion 40 merges into a further flanged portion 44 providing means whereby the key may be driven in position by an instrument such as a hammer. The positions of the portions 40 and 44 are such that they are disposed so that the portion 40 will clear the top lug 28 on the brake shoe, and also the inside wall 46 of the top end of the brake head. With a key of this construction the key can be inserted into the head and shoe approximately four-fifths of its length before it is necessary to drive the key with a hammer, thus making the key very easy to apply in spite of the present day truck clearance conditions which normally interfere with the driving of the present day keys. In use wear will occur at the intermediate lugs and then there will be bearing at four points between the head and shoe, i. e., at both the toe and intermediate lugs, although when the shoe is applied there will automatically be bearing on the intermediate lugs only due to infringing clearances permitted. It is to be noted that the intermediate lugs have bearing at the time of application of the shoe to the head.

In the construction shown in Figure 3, the head 48 is similar to the head 10, with the exception that the tie bars 20 are omitted from the spaced lugs 26. With the key 30 the straight portion 38 thereof is advantageous with this type of brake head in that it provides a wedge, the wedge action occurring between the flat portion 38 of the key and the top or adjacent center toe 22 of the brake head which is engaged by a portion of this flattened section 38 of the key. Proper clearances are also maintained by the shape of the end portion 40 between the lug 28 and the inside wall 46 of the brake head.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake head and shoe assembly, the combination of a brake head having toe lugs, a brake shoe carried by said head and having a center lug, and a resilient key engaging said toe and center lugs and flexed therebetween for securing said shoe to said head, said key being of general arcuate shape provided with a flat portion engaging a portion of said head.

2. In a brake head and shoe assembly, the combination of a brake head having toe lugs, a brake shoe carried by said head and having a center lug, and a resilient key engaging said toe and center lugs and flexed therebetween for securing said shoe to said head, said key being of general arcuate shape provided with a flat tapered portion engaging a portion of said head.

3. In a brake head and shoe assembly, the combination of a brake head having spaced toe lugs adjacent the upper and lower ends thereof, intermediate brake head lugs, a brake shoe engaging said intermediate lugs, said shoe having a center lug disposed between said intermediate lugs, and a key for securing said brake shoe to said head, said key engaging said toe and center lugs and spaced from said intermediate lugs, said key being of general arcuate shape provided with a flat portion engaging one of said toe lugs.

4. In a brake head and shoe assembly, the combination of a brake head having spaced toe lugs adjacent the upper and lower ends thereof, intermediate brake head lugs, a brake shoe engaging said intermediate lugs, said shoe having a center lug disposed between said intermediate lugs, and a key for securing said brake shoe to said head, said key engaging said toe and center lugs and spaced from said intermediate lugs, said key being of general arcuate shape provided with a flat tapered portion engaging one of said toe lugs.

5. In a brake head and shoe assembly, the combination of a brake head having spaced toe lugs adjacent the upper and lower ends thereof, intermediate brake head lugs, a brake shoe engaging said intermediate lugs and spaced from said toe lugs, and a key for securing said brake shoe to said head, said key engaging said toe lugs and spaced from said intermediate lugs, said key being of general arcuate shape provided with a flat tapered portion engaging one of said toe lugs.

6. In a brake head and shoe assembly, the combination of a brake head having spaced toe lugs adjacent the upper and lower ends thereof, intermediate brake head lugs, a brake shoe engaging said intermediate lugs and spaced from said toe lugs, said shoe having a center lug disposed between said intermediate lugs, and a key for securing said brake shoe to said head, said key engaging said toe and center lugs and spaced from said intermediate lugs, said key being of general arcuate shape provided with a flat tapered portion engaging one of said toe lugs.

7. In a brake head and shoe assembly, the combination of a brake head having toe lugs, a brake shoe carried by said head and having a center lug, and a resilient key engaging said toe and center lugs and flexed therebetween for securing said shoe to said head, said key being substantially arcuate in side elevation and provided with an offset approach portion, a portion of said key in side elevation being substantially straight.

8. In a brake head and shoe assembly, the combination of a brake head having toe lugs, a brake shoe carried by said head and having a center lug, and a resilient key engaging said toe and center lugs and flexed therebetween for securing said shoe to said head, said key being substantially arcuate in side elevation and provided with an offset approach portion, a portion of said key in side elevation being substantially straight and tapered.

9. In a brake head and shoe assembly, the combination of a brake head having toe lugs, a brake shoe carried by said head and having a center lug, and a resilient key engaging said toe and center lugs and flexed therebetween for securing said shoe to said head, said key being substantially arcuate in side elevation and provided with a knuckled approach portion, the thickness of said key substantially varying toward the head, a portion of said key between the ends thereof being straight.

10. In a brake head and shoe assembly, the combination of a brake head having toe lugs, a brake shoe carried by said head and having a center lug, and a resilient key engaging said toe and center lugs and flexed therebetween for securing said shoe to said head, said key being substantially arcuate in side elevation and provided with a knuckled approach portion, the thickness of said key substantially varying toward the head, adjacent portions of said key between the ends thereof being straight.

11. In a brake head and shoe assembly, the combination of a brake head having toe lugs, a brake shoe carried by said head and having a center lug, and a resilient key engaging said toe and center lugs and flexed therebetween for securing said shoe to said head, said key being substantially arcuate in side elevation and provided with a knuckled approach portion, the thickness of said key substantially varying toward the head, a portion of said key between the ends thereof being straight, said portion being adjacent the crown of said key.

12. In a brake head and shoe assembly, the combination of a brake head having toe lugs, a brake shoe carried by said head and having a center lug, and a resilient key engaging said toe and center lugs and flexed therebetween for securing said shoe to said head, said key being substantially arcuate in side elevation and provided with a knuckled approach portion, the thickness of said key substantially varying toward the head, adjacent portions of said key between the ends thereof being straight, one of said portions being adjacent the crown of said key.

13. A spring steel key for securing means between a brake head and brake shoe, said key having an offset approach portion adjacent one end and a head adjacent the other, said key being of general arcuate shape between the ends, a portion of said key adjacent the crown thereof being offset in substantially straight relation in respect thereto.

14. A spring steel key for securing means between a brake head and brake shoe, said key having an offset approach portion adjacent one end and a head adjacent the other, said key being of general arcuate shape between the ends, a portion of said key adjacent the crown thereof being offset in substantially straight relation in respect thereto said portion being tapered.

15. A spring steel key for securing means between a brake head and brake shoe, said key having an offset approach portion adjacent one end and a head adjacent the other, said key being of general arcuate shape between the ends, a portion of said key adjacent the crown thereof being substantially straight, said key having an offset straight portion between said head and said first named straight portion.

16. A spring steel key for securing means between a brake head and brake shoe, said key having an offset approach portion adjacent one end and a head adjacent the other, said key being of general arcuate shape between the ends, a portion of said key adjacent the crown thereof being substantially straight and tapered, said key having an offset straight portion between said head and said first named straight portion.

17. In a brake head and shoe assembly, the combination of a brake head having spaced intermediate lugs, a brake shoe engaging said intermediate lugs, said shoe having a center lug disposed between said intermediate lugs, and a key for securing said brake shoe to said head, said key engaging said lugs, said key being of general arcuate shape provided with a flat portion engaging one only of said intermediate lugs, the ends of said key being free from engagement with said brake head.

18. In a brake head and shoe assembly, the combination of a brake head having spaced intermediate lugs, a brake shoe engaging said intermediate lugs, said shoe having a center lug disposed between said intermediate lugs, and a key for securing said brake shoe to said head, said key engaging said lugs, said key being of general arcuate shape provided with a flat tapered portion engaging one only of said intermediate lugs, the ends of said key being free from engagement with said brake head.

EDWARD J. SIMANEK.